United States Patent
Mourra et al.

(10) Patent No.: US 7,490,077 B2
(45) Date of Patent: Feb. 10, 2009

(54) EXTENSIBLE DEPENDENCY MANAGEMENT FRAMEWORK AND METHOD

(75) Inventors: John Mourra, Toronto (CA); Vladimir Klicnik, Oshawa (CA); Lok Tin Loi, Toronto (CA); Hiroshi Tsuji, Stouffville (CA)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 11/536,151

(22) Filed: Sep. 28, 2006

(65) Prior Publication Data

US 2008/0082476 A1 Apr. 3, 2008

(51) Int. Cl.
G06F 7/00 (2006.01)
G06F 17/30 (2006.01)
G06F 3/00 (2006.01)
G06F 9/44 (2006.01)
G06F 9/46 (2006.01)
G06F 13/00 (2006.01)

(52) U.S. Cl. .................................... 707/1; 719/315
(58) Field of Classification Search ................ None
See application file for complete search history.

(56) References Cited

U.S. PATENT DOCUMENTS

| | | | |
|---|---|---|---|
| 6,256,773 B1 * | 7/2001 | Bowman-Amuah | 717/121 |
| 6,847,970 B2 | 1/2005 | Keller et al. | |
| 2002/0087734 A1 | 7/2002 | Marshall et al. | |
| 2004/0221202 A1 | 11/2004 | Nye et al. | |
| 2005/0262482 A1 * | 11/2005 | Wagner et al. | 717/120 |
| 2005/0278273 A1 * | 12/2005 | Uthe | 707/1 |
| 2006/0265696 A1 * | 11/2006 | Mayfield et al. | 717/137 |

OTHER PUBLICATIONS

Chen et al., "Dependency Management In Distributed Settings", 2004, Dartmouth Computer Science Technial Report TR2004-495, pp. 1-8.*

* cited by examiner

Primary Examiner—Tim T Vo
Assistant Examiner—Jeremy D Engelskirchen
(74) Attorney, Agent, or Firm—David Irvin; Hoffman Warnick LLC

(57) ABSTRACT

The present invention provides an extensible dependency management framework and method. Specifically, the present invention provides dependency management handler (s) and dispatcher(s) (e.g., revalidation and/or refactoring). The handlers are created and registered by users of the framework. When a change to a resource is detected, a notification is received by a dispatcher from an external caller. Upon receipt, the dispatcher will query an index to identify dependents, and then call a dependency management handler associated with the changed resource to obtain and implement updates for the dependents. In so doing, a list of the dependents will be provided to the dependency management handler.

3 Claims, 2 Drawing Sheets

EXTENSIBLE DEPENDENCY MANAGEMENT FRAMEWORK AND METHOD

BACKGROUND OF THE INVENTION

1. Field of the Invention

In general, aspects of the present invention provide an extensible dependency management framework and method. Specifically, the present invention provides an extensible framework for managing changes to interdependent resources.

2. Related Art

In an interdependent environment, change comes at the expense of consequential ripple effects. Today's complex software, especially in object-oriented form, is composed of highly interdependent components that interact on various levels in sometimes unpredictable ways, leaving the scope of change-triggered ripple effects unrestricted. Such software systems suffer from high maintenance costs when a change in one of their components is required, since dependent components may, in turn, need to be updated in order to maintain the integrity of the system. This creates a complex cause-and-effect chain of events that could render a system unusable if not managed properly.

Specific solutions to the dependency management problem do currently exist, in the form of highly specialized mechanisms that deal with specific types of resources or changes (e.g. Java™ code refactoring). Java and all Java-related trademarks are trademarks of Sun Microsystems, Inc. in the United States, other countries, or both. Drawbacks of such solutions lie in their specificity and lack of extensibility. Furthermore, known solutions provide one-level of dependency management. In other words, updates are made only to direct dependents when a change is made and not to indirect dependents in an iterative manner.

SUMMARY OF THE INVENTION

In general, aspects of the present invention provide an extensible dependency management framework (and method) that provides the core foundation for enabling and facilitating structured responses to changes in resources (e.g., files and/or folders) by enabling updates to be made to dependent resources. The described framework is extensible from multiple perspectives. For example, it allows for the pluggability of independently-implemented handlers to perform the actual change management update tasks. In addition, it exposes an extensible design that allows for specializations of the framework itself, to alter the fundamental nature of the dependency management and give it a specific flavor. Two illustrative examples of such specializations are also described herein, namely refactoring and revalidation extensions. However, this design allows for any additional type of dispatchers and/or handlers to be plugged into the framework. Another advantage of this solution is its facilitation of iterative dependency-based change management, where updates that occur during one dependency management cycle result in further change events that in turn trigger additional updates in respective dependents.

To this extent, the present invention provides dependency management handler(s) and dispatcher(s) (e.g., revalidation and/or refactoring). The handlers are created and registered by users of the framework. When a change to a resource is detected, a notification is received by a dispatcher from an external caller. Upon receipt, the dispatcher will query an index to identify dependents, and then call a dependency management handler associated with the changed resource to obtain and implement updates for the dependents. In so doing, a list of the dependents will be provided to the dependency management handler.

A first aspect of the present invention provides an extensible dependency management framework, comprising: a dispatcher system for creating and registering a set of dependency management dispatchers; a handler system for creating and registering a set of dependency management handlers; and a change management system for receiving notifications of changes to resources from the set of dependency management dispatchers, for querying an index to identify dependents of the changed resources, and for calling the set of dependency management handlers associated with the changed resource to update the dependents.

A second aspect of the present invention provides an extensible dependency management method, comprising: receiving a notification of a change to a resource from a dependency management dispatcher; querying an index to identify a set of dependents of the changed resource; and calling a dependency management handler associated with the changed resource to update the set of dependents.

A third aspect of the present invention provides at least one program product stored on a computer readable medium for managing dependency updates, the at least one computer readable medium comprising program code for causing a computer system to perform the following: receive a notification of a change to a resource from a dependency management dispatcher; query an index to identify a set of dependents of the changed resource; and call a dependency management handler associated with the changed resource to update the set of dependents.

A fourth aspect of the present invention provides a method for deploying a system for managing dependency updates, comprising: providing a computer infrastructure being operable to: receive a notification of a change to a resource from a dependency management dispatcher; query an index to identify a set of dependents of the changed resource; and call a dependency management handler associated with the changed resource to update the set of dependents.

A fifth aspect of the present invention provides a data processing system, comprising: at least one processor; a bus coupled to the at least one processor; at least one memory medium coupled to the bus, the at least one memory medium comprising instructions, and the at least one processor being operable to execute the instructions to cause the data processing system to perform the following: receive a notification of a change to a resource from a dependency management dispatcher; query an index to identify a set of dependents of the changed resource; and call a dependency management handler associated with the changed resource to update the set of dependents.

For each of these aspects, the following additional aspect can be provided: the set of dependency management handlers comprises at least one of a refactoring hander and a revalidation handler, and the set of dependency management dispatchers comprises at least one of a refactoring dispatcher and a revalidation dispatcher.

For each of these aspects, the following additional aspect can be provided: the set of dependency management handlers and/or set of dependency management dispatchers each implement at least one interface.

For each of these aspects, the following additional aspect can be provided: the notifications are received by the dependency management dispatchers from external callers.

For each of these aspects, the following additional aspect can be provided: the dependency management framework provides resource level management and element level management of the changes to the resources.

For each of these aspects, the following additional aspect can be provided: the dependency management handlers obtain updates to the dependents, and manage the implementation of the updates in response to the calls received from the handler system.

For each of these aspects, the following additional aspect can be provided: the dependents are identified to the dependency management handlers in a list of dependents.

BRIEF DESCRIPTION OF THE DRAWINGS

These and other features of this invention will be more readily understood from the following detailed description of the various aspects of the invention taken in conjunction with the accompanying drawings in which.

Figure 1:
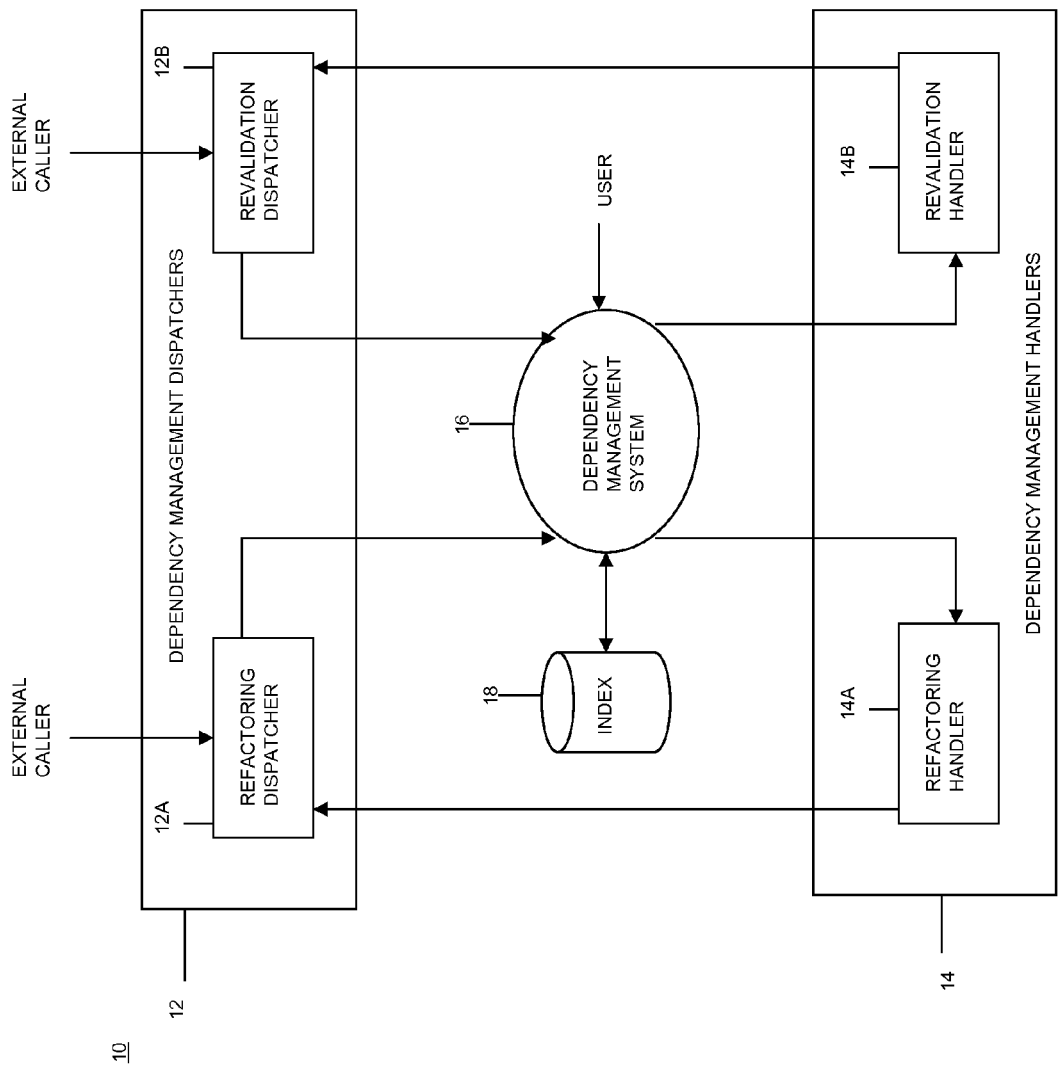
FIG. 1 depicts a high level diagram of the extensible dependency management framework according to one aspect of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. General Description
II. Computerized Implementation

I. General Description

As indicated above, aspects of the present invention provide an extensible dependency management framework (and method) that provides the core foundation for enabling and facilitating structured responses to changes in resources (e.g., files and/or folders) by enabling updates to be made to dependent resources. The described framework is extensible from multiple perspectives. For example, it allows for the pluggability of independently-implemented handlers to perform the actual change management update tasks. In addition, it exposes an extensible design that allows for specializations of the framework itself, to alter the fundamental nature of the dependency management and give it a specific flavor. Two illustrative examples of such specializations are also described herein, namely refactoring and revalidation extensions. However, this design allows for any additional type of dispatchers and/or handlers to be plugged into the framework. Another advantage of this solution is its facilitation of iterative dependency-based change management, where updates that occur during one dependency management cycle result in further change events that in turn trigger additional updates in respective dependents.

Referring now to FIG. 1, a high level diagram of an extensible dependency management framework (hereinafter framework 10) according to the present invention is shown. It should be understood in advance that FIG. 1 depicts two specializations, namely refactoring and revalidation. However, these examples are intended to be illustrative only and the present invention is not limited to those.

In any event, as shown, framework 10 includes a set (e.g., one or more) of dependency management dispatchers 12A-B, a set of dependency management handlers 14A-B, dependency management system 16, and index 18. Framework 10 enables and facilitates a structured response to changes in resources by systematically triggering updates in dependent resources. Users of framework 10 create dependency management handlers 14A-B that implement one or more specific interfaces provided by specializations of the framework 10, and register these handlers 14A-B (via dependency management system 16).

External callers notify framework 10 of resource changes that require management by making calls to a corresponding implementation of a dependency management dispatcher 12A-B (which also each implement an interface, and which can be created and registered via framework 10). The dependency management dispatcher 12A-B will process the passed-in change information, and query index 18 (via dependency management system 16) to find dependents of the changed resource. In turn, all interested dependency management handlers 14A-B for that dispatcher will be called to inform them of the change(s), along with providing a list of dependents that might be affected by the change. Essentially, dependency management system 16 dissects received resource change events, queries dependents, and triggers appropriate methods on the respective dependency management handlers 14A-B.

The dependency management framework provides at least two levels of change management support: (a) Resource Level Management: This level of dependency management entails notification of resource changes such as resource additions, moves, copies, deletes, renames, and general modification (without information about what changed). Dependency management handlers 14A-B responsible for resource-level management implement resource-level interfaces and deal with changes at the resource level. They would receive notification when such changes occur and will be given all dependent resources; and (b) Element Level Management: This level of dependency management entails notification of changes in specific elements of a resource, examples of which include changes in a method of a Java file or a port type of a WSDL file. Such changes include the adding, moving, copying, deleting, renaming, and modification of an element. Dependency management handlers 14A-B responsible for this type of management implement element-level interfaces and deal with changes at the element level. They would receive notification when such changes occur and will be given only the dependent resources that specifically depend on the element that has changed, as identified by querying index 18.

Thus, framework 10 facilitates updates in dependent resources, as a result of changes that occur in resources. It also allows for iterative dependency management where changes that occur during one change cycle result in further dependency management events. Note that this occurs only if dependency management handler 14A-B that makes the change chooses to allow such iteration by calling the dispatcher to notify the framework 10 of the change. One design point is that framework 10 need not trigger dispatchers 12A-B on every resource change (e.g., unless a provided Dependency Management Command is actually used to explicitly do this by plugging into a resource change listener). In general, however, dependency management is an explicit choice, and not simply a consequence of making changes to resources.

Dispatching must be triggered by components making changes in resources if they require dependency change management as a result of the change they are making (this includes editors and other UT elements, as well as implementers of dependency management handlers themselves). To make use of element-level management, instigators of resource changes must indicate, through the dispatcher, the specific elements that were changed. An element is identified by two qualified names, an element type and an element name. It is important that the element type/name qualified names used when triggering dependency management on an element change are aligned with those queried from index 18.

Functionally, users of the dependency management framework can be divided into at least two groups: Consumers and Implementers, where: (a) Consumers request that management be performed after they make a change in a resource or an element of a resource. They do so by making calls to a specific dependency management dispatcher 12A-B class. Along these lines, Consumers pass in information regarding the change they made, such as modified resource, modified element type, modified element name, as well as context information; and (b) Implementers create dependency management handlers 14A-B by implementing a specific dependency management handler interface. As part of their implementation, Implementers update resources that depend on the resource or element that changed. When called, they are passed a set of dependent resources by the framework. Implementers can act as Consumers in their implementation of the dependency management handler 14A-B. For example, consumers can make calls to a dependency management dispatcher 12A-B after they make changes to dependent resources, in order to trigger further change management.

Still yet, to interface and receive invocation through the Multiple Invocation Style Integration Framework mechanisms (disclosed in commonly owned and co-pending Published U.S. application Ser. No. 10/906,592, filed Feb. 25, 2005, the entire contents of which are herein incorporated by reference) framework 10 contributes a command to the command extension point. This command will translate resource change information into corresponding calls to the respective dependency management dispatcher 12A-B. This expands the invocation options and usage spectrum of framework 10 by allowing for management events to be triggered through various mechanisms, including resource change listeners, builders, and batch scripts.

It should be understood that refactoring and revalidation are only intended as two possible examples of dispatchers 12A-B and/or handlers 14A-B. Along these lines, framework 10 is entirely extensible to allow for any additional types of dispatchers 12A-B and/or handlers 14A-B to be plugged in.

II. Computerized Implementation

Figure 2:
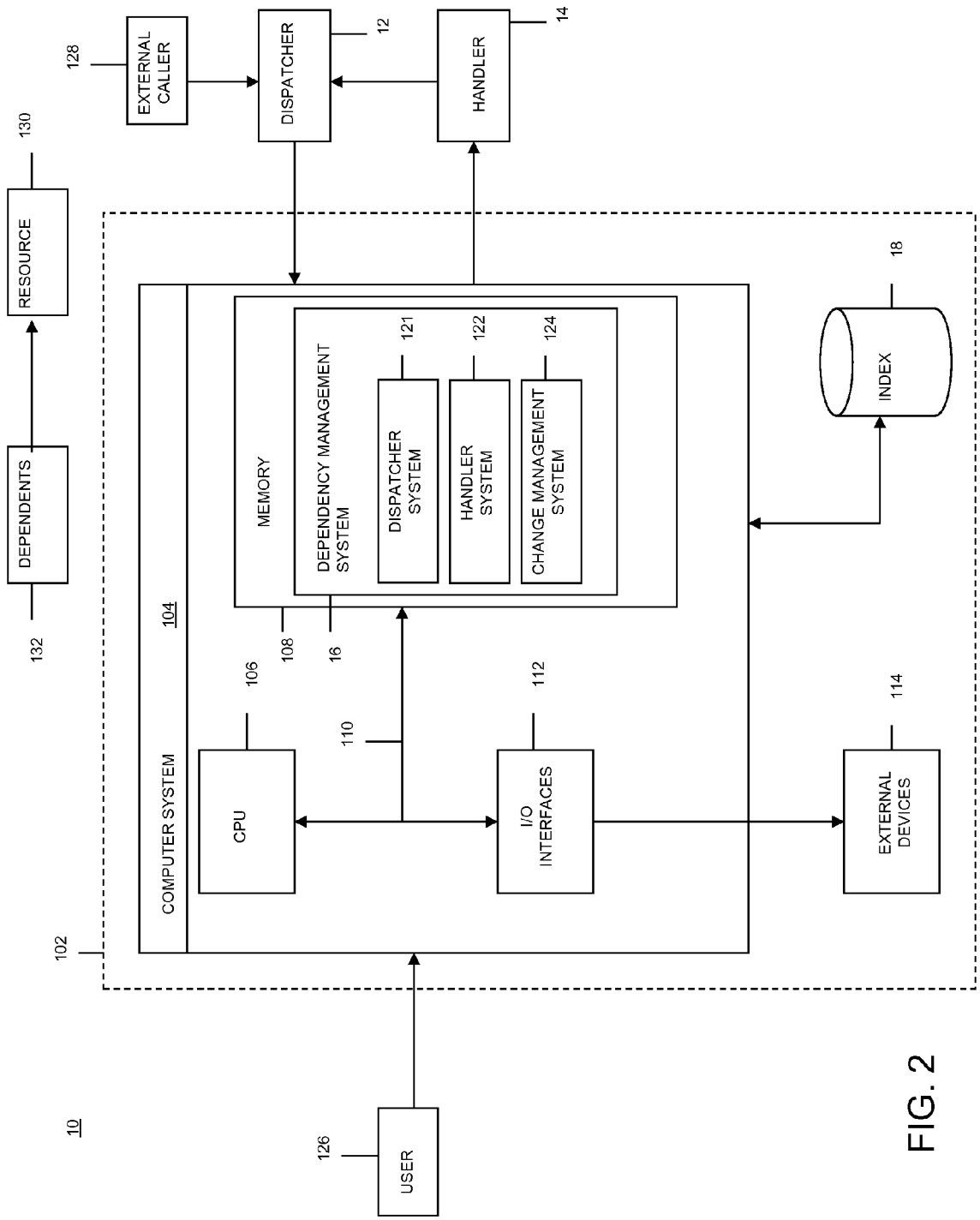
FIG. 2 depicts a more specific computerized diagram of the extensible dependency management framework of FIG. 1.

Referring now to FIG. 2, a more specific computerized implementation of framework 10 according to the present invention is shown. As depicted, framework 10 includes computer system 104 deployed within a computer infrastructure/ environment 102. This is intended to demonstrate, among other things, that some or all of the teachings of the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of framework 10 could be deployed, managed, serviced, etc. by a service provider who offers to manage dependency updates.

As shown, computer system 104 includes a processing unit (CPU) 106, a memory 108, a bus 110, and input/output (I/O) interfaces 112. Further, computer system 104 is shown in communication with external I/O devices/resources 114 and index 18. In general, processing unit 106 executes computer program code, such as dependency management system 16, which is stored in memory 108. While executing computer program code, processing unit 106 can read and/or write data to/from memory 108, index 18, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other devices.

Computer infrastructure 102 is only illustrative of various types of computer infrastructures for implementing the invention. For example, in one embodiment, computer infrastructure 102 comprises two or more devices (e.g., a server cluster) that communicate over a network to perform the various process of the invention. Moreover, computer system 104 is only representative of various possible computer systems that can include numerous combinations of hardware. To this extent, in other embodiments, computer system 104 can comprise any specific purpose article of manufacture comprising hardware and/or computer program code for performing specific functions, any article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or index 18 can comprise any combination of various types of data storage and/or transmission media that reside at one or more physical locations. Further, I/O interfaces 112 can comprise any system for exchanging information with one or more external devices 114. Still further, it is understood that one or more additional components (e.g., system software, math co-processing unit, etc.) not shown in FIG. 2 can be included in computer system 104. However, if computer system 104 comprises a handheld device or the like, it is understood that one or more external devices 114 (e.g., a display) and/or index 18 could be contained within computer system 104, not externally as shown.

Index 18 can be any type of system (e.g., a database) capable of providing storage for information under the present invention. To this extent, index 18 could include one or more storage devices, such as a magnetic disk drive or an optical disk drive. In another embodiment, index 18 includes data distributed across, for example, a local area network (LAN), wide area network (WAN) or a storage area network (SAN) (not shown). Index 18 could also represent code that dynamically responds to queries by parsing files as information is requested.

Shown in memory 108 of computer system 104 is dependency management system 16, which includes dispatcher system 121, handler system 122 and change management system 124. It should also be understood that the various systems and their sub-systems of FIG. 2 are shown as such for illustrative purposes only and that the same functionality could be implemented with a different configuration of systems and sub-systems.

In any event, dependency management dispatchers 12 and dependency management handler(s) 14 will be created and registered as described above by user 126 (e.g., Implementer) via dispatcher system 121 and handler system 122, respectively. When external caller 128 (e.g., a Consumer) determines that a resource 130 has changed and that its dependents 132 should be changed as well, a call will be made to dependency management dispatcher 12 (created and registered via dispatcher system 121). In response, dependency management dispatcher 12 will provide this notification to change management system 124, and then use change management system 124 to query index 18 to identify any dependent(s) 132 of the changed resource 130. Once so identified, a list of dependent(s) 132 will be provided to a corresponding/associated dependency management handler 14 with notification of the change as well as the list of dependent(s) 132. In turn, dependency management handler 14 will obtain and implement any updates to dependents 132. It should be understood that although shown external to computer system 104, dispatchers 12 and/or handlers 14 could be provided as part of computer system 104.

While shown and described herein as an extensible dependency management framework and method, it is understood that the invention further provides various alternative embodiments. For example, in one embodiment, the invention provides at least one computer-readable/useable medium that includes computer program code to enable a computer infrastructure to manage dependency updates. To this extent, the at least one computer-readable/useable medium includes program code that implements each of the various process of the invention. It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a device, such as memory 108 (FIG. 2) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to manage dependency updates. In this case, the service provider can create, maintain, deploy, support, etc., a computer infrastructure, such as computer infrastructure 102 (FIG. 2) that performs the process of the invention for one or more customers. In return, the service provider can receive payment from the target organization(s) under a subscription and/or fee agreement and/or the service provider can receive payment from the sale of advertising content to one or more third parties.

In still another embodiment, the invention provides a computer-implemented method for managing dependency updates. In this case, a computer infrastructure, such as computer infrastructure 102 (FIG. 2), can be provided and one or more systems for performing the process of the invention can be obtained (e.g., created, purchased, used, modified, etc.) and deployed to the computer infrastructure. To this extent, the deployment of a system can comprise one or more of (1) installing program code on a device, such as computer system 104 (FIG. 2), from a computer-readable medium; (2) adding one or more devices to the computer infrastructure; and (3) incorporating and/or modifying one or more existing systems of the computer infrastructure to enable the computer infrastructure to perform processes according to one or more aspects of the invention.

As used herein, it is understood that the terms "program code" and "computer program code" are synonymous and mean any expression, in any language, code or notation, of a set of instructions intended to cause a device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular providing and/or I/O device, and the like.

Aspects of the invention can take the form of an entirely software embodiment or an embodiment containing both hardware and software elements. In an embodiment, aspects of the invention are implemented in software, which includes but is not limited to firmware, resident software, microcode, etc. Furthermore, aspects of the invention can take the form of a computer program product accessible from at least one computer-usable or computer-readable medium storing program code for use by or in connection with a computer or any instruction execution system. For the purposes of this description, a computer-usable or computer readable medium can be any tangible apparatus that can contain, store, communicate, propagate, and/or transport the program for use by or in connection with the instruction execution system, apparatus, device, and/or the like.

The medium can be an electronic, magnetic, optical, electromagnetic, infrared, or semiconductor system (or apparatus or device), a propagation medium, and/or the like. Examples of a computer-readable medium include, but are not limited to, a semiconductor or solid state memory, magnetic tape, a removable computer diskette, a random access memory (RAM), a read-only memory (ROM), a rigid magnetic disk and an optical disk. Current examples of optical disks include, but are not limited to, compact disk—read only memory (CD-ROM), compact disk—read/write (CD-R/W) and DVD.

A data processing system suitable for storing and/or executing program code can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or IPO devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. An extensible dependency management framework, comprising:
    at least one computer including:
        a dispatcher system for creating and registering a set of dependency management dispatchers, wherein the set of dependency management dispatchers comprises at least one of a refactoring dispatcher or a revalidation dispatcher and wherein the set of dependency management dispatchers receive notifications of changes to resources from external callers;
        a handler system for creating and registering a set of dependency management handlers that is distinct from the set of dependency management dispatchers, wherein each dependency management handler performs change management update tasks for a set of dependents of a changed resource, wherein the set of dependency management handlers comprises at least one of a refactoring handler or a revalidation handler, and wherein the set of dependency management handlers and the set of dependency management dispatchers each implement at least one interface; and
        a change management system for receiving notifications of changes to resources from the set of dependency management dispatchers, for querying an index to identify dependents of the changed resources, and for calling the set of dependency management handlers associated with the changed resources to update the dependents;
    wherein the dependency management framework provides resource level management and element level management of the changes to the resources;
    wherein the change management system further identifies the dependents to the set of dependency management handlers; and
    wherein the set of dependency management handlers obtains updates to the dependents, and manages implementation of the updates in response to the calls received from the change management system.

2. An extensible dependency management method, comprising:
    creating and registering a dependency management dispatcher and a dependency management handler distinct from the dependency management dispatcher, wherein the dependency management handler is associated with a resource;
    receiving a notification of a change to the resource from the dependency management dispatcher;
    querying an index to identify a set of dependents of the changed resource;
    calling the dependency management handler associated with the changed resource to update the set of dependents;
    obtaining updates to the set of dependents; and
    implementing the updates using the dependency management handler;
    wherein the notification is received by the dependency management dispatcher from an external caller;
    wherein the dependency management handler is selected from a group consisting of: a refactoring handler and a revalidation handler, and wherein the dependency management dispatcher is selected from a group consisting of: a refactoring dispatcher and a revalidation dispatcher; and
    wherein the dependency management dispatcher and the dependency management handler each implements an interface.

3. A computer readable storage medium having a program product stored thereon for managing dependency updates, the computer readable medium comprising program code for causing a computer system to perform the following:
    create and register a dependency management dispatcher and a dependency management handler distinct from the dependency management dispatcher, wherein the dependency management handler is associated with a resource;
    receive a notification of a change to the resource from the dependency management dispatcher;
    query an index to identify a set of dependents of the changed resource;
    call the dependency management handler associated with the changed resource to update the set of dependents;
    obtain updates to the set of dependents; and
    implement the updates using the dependency management handler;
    wherein the notification is received by the dependency management dispatcher from an external caller;
    wherein the dependency management handler is selected from a group consisting of: a refactoring handler and a revalidation handler, and wherein the dependency management dispatcher is selected from a group consisting of: a refactoring dispatcher and a revalidation dispatcher; and
    wherein the dependency management dispatcher and the dependency management handler each implements an interface.

* * * * *